US012706942B2

(12) United States Patent
Abate et al.

(10) Patent No.: US 12,706,942 B2
(45) Date of Patent: Aug. 11, 2026

(54) SYSTEMS AND METHODS FOR DEPLOYING AGENTLESS COUNTERMEASURES IN A NETWORK ENVIRONMENT

(71) Applicant: Fortinet Inc., Sunnyvale, CA (US)

(72) Inventors: Jason Abate, Chicago, IL (US); Shabbir Karimi, Downers Grove, IL (US)

(73) Assignee: Fortinet Inc., Sunnyvale, CA (US)

( * ) Notice: Subject to any disclaimer, the term of this patent is extended or adjusted under 35 U.S.C. 154(b) by 306 days.

(21) Appl. No.: 18/237,139

(22) Filed: Aug. 23, 2023

(65) Prior Publication Data

US 2025/0071138 A1 Feb. 27, 2025

(51) Int. Cl.
*H04L 9/40* (2022.01)

(52) U.S. Cl.
CPC ................................ *H04L 63/1441* (2013.01)

(58) Field of Classification Search
CPC ............................ H04L 63/1441; H04L 63/20
See application file for complete search history.

(56) References Cited

U.S. PATENT DOCUMENTS

2009/0150525 A1* 6/2009 Edgett ..................... H04L 63/08 726/3
2013/0091534 A1* 4/2013 Gilde ...................... H04L 63/10 726/13
2014/0041012 A1* 2/2014 Yeow ...................... H04L 63/02 726/11
2018/0219880 A1* 8/2018 Deardorff ........... H04L 63/1491
2018/0359272 A1* 12/2018 Mizrachi ............... H04L 67/535
2020/0162503 A1* 5/2020 Shurtleff ............. H04L 41/0894
2020/0204434 A1* 6/2020 Nitsch ................. G06F 11/0772
2020/0259700 A1* 8/2020 Bhalla ................... G06F 3/0482
2021/0168025 A1* 6/2021 Stephens ............. H04L 41/0661
2022/0166783 A1* 5/2022 Yavo ................... H04L 63/1425
2022/0210168 A1* 6/2022 Yavo ................... H04L 63/1433

OTHER PUBLICATIONS

Wang et al., "A New Remediation Model Based on Trusted Network", Dec. 2008, International Conference on Computational Intelligence and Security, pp. 242-245 (Year: 2008).*

* cited by examiner

*Primary Examiner* — Kenneth W Chang
(74) *Attorney, Agent, or Firm* — Law Office of Dorian Cartwright; Dorian Cartwright

(57) ABSTRACT

Various approaches for providing network maintenance and health monitoring are discussed. In some cases, some approaches include systems, methods, and/or devices that provide for detecting problematic network behavior and deploying countermeasures in relation to the detected behavior without an agent operating on the device where the countermeasures are implemented.

18 Claims, 5 Drawing Sheets

SYSTEMS AND METHODS FOR DEPLOYING AGENTLESS COUNTERMEASURES IN A NETWORK ENVIRONMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright @ 2021, Fortinet, Inc.

FIELD

Embodiments discussed generally relate to network maintenance and health monitoring. Some embodiments provide for detecting problematic network behavior and deploying countermeasures in relation to the detected behavior without an agent operating on the device where the countermeasures are implemented.

BACKGROUND

It is not uncommon for large operations teams, especially in a distributed environment, to oversee network and network related functionality. The size of the organizations makes it challenging to coordinate knowledge around solutions to common incidents that arise with regularity. In their environments, the same problems often encounter repeatedly, with different team members having to identify, triage, troubleshoot and resolve the same problem over and over prior to a permanent solution being put in place. This applies even more to managed service providers, who are running similar but slightly different environments for each of their customers. To address this, products have been developed to automate the identification and remediation of network issues from the perspective of a network device. However, such products rely upon an agent executing on a given network device that receives remediation data and applies the remediation data to the given network device. Such an approach will not work for many network devices as they are closed systems that do not allow for installation of an agent necessary for performing the remediation. Further, such products do not allow for consideration of parameters beyond the given network device in making a decision of what remediation to apply.

Thus, there exists a need in the art for more advanced approaches, devices and systems for monitoring and addressing network functionality.

SUMMARY

Various embodiments provide systems and methods for network maintenance and monitoring. Some embodiments provide for detecting problematic network behavior and deploying countermeasures in relation to the detected behavior without an agent operating on the device where the countermeasures are implemented.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
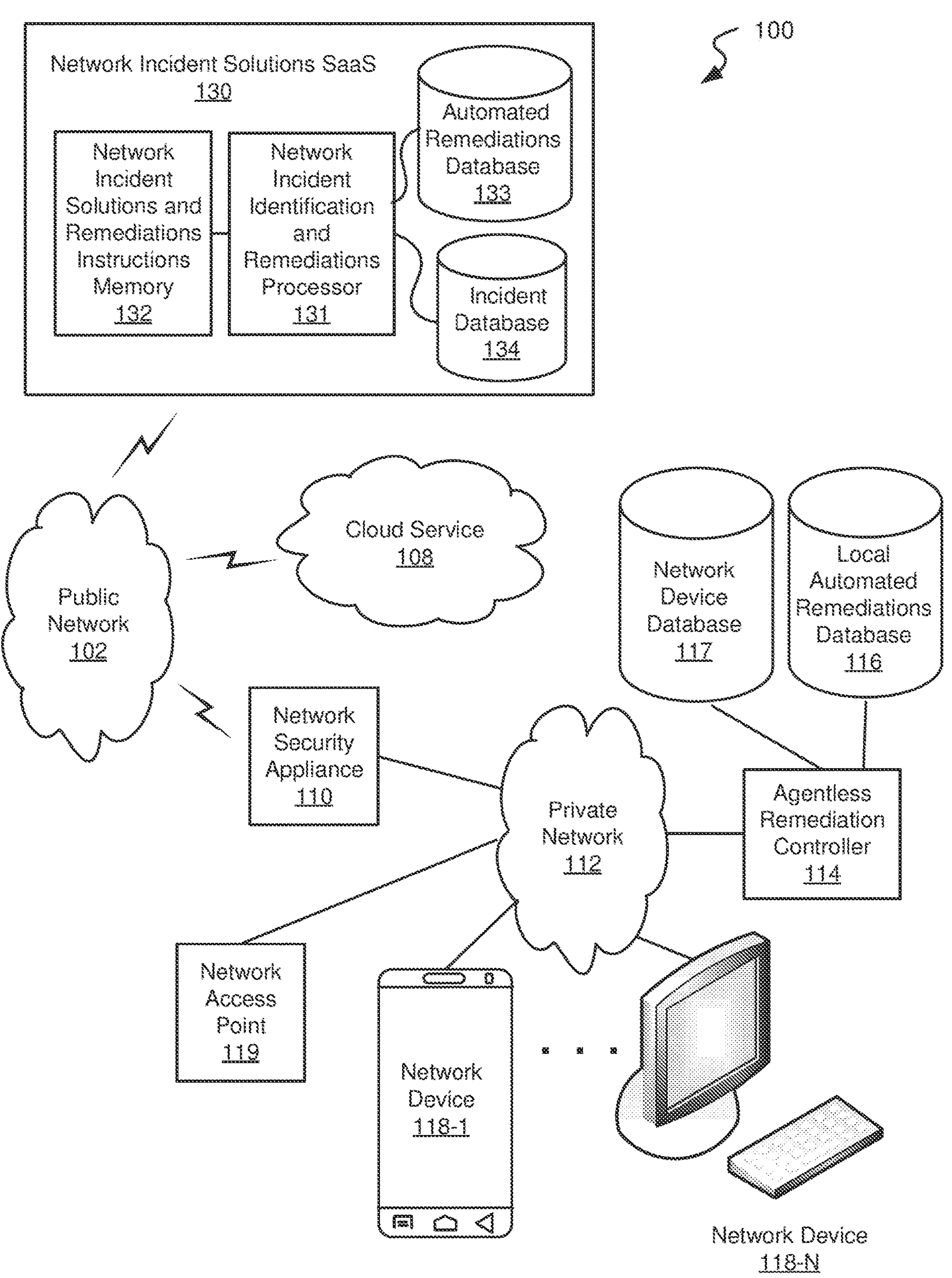
FIGS. 1A-1C illustrate a network architecture in accordance with some embodiments.

Various embodiments provide systems and methods for network maintenance and monitoring. Some embodiments provide for detecting problematic network behavior and deploying countermeasures in relation to the detected behavior without an agent operating on the device where the countermeasures are implemented.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network element malfunction" is used in its broadest sense to mean any malfunction within a network environment including, but not limited to: a failure of a network server; a failure of a cloud based service; a failure of an endpoint device; a failure of a software application executing on a device in the network such as, for example, a network server or an endpoint device; and/or a failure of a downstream provider. Based upon the disclosure provided herein, one of ordinary skill in the art will recognize a myriad of malfunctions that may be considered a network element malfunction The phrase "automated remediation" is used in its broadest sense to mean one or more actions that are automatically employed as part of diagnosing and/or mitigating a network condition based upon the occurrence of a condition set. For example, where it is detected that the CPU usage of a network device has exceeded a defined threshold for a defined period (i.e., the condition set), the automated remediation may be to assign an incident lead and log the incident lead into the particular network device. Such an automated remediation that automatically connects an incident lead and provides status may be referred to herein as a "diagnostic automated remediation". As another example, where it is detected that the memory usage of a network device has exceeded a defined threshold for a defined period (i.e., the condition set), the automated remediation may be to automatically restart the network device and send a message to an incident lead identifying the conditions surrounding the incident. As yet another example, where it is detected that the CPU usage of a network device has exceeded a defined threshold for a defined period (i.e., the condition set), the automated remediation may be to automatically stop a process executing on the network device that is using significant CPU bandwidth. Such automated remediations that automatically modify the operation of one or more network devices may be referred to herein as an "active automated remediation". Such automated remediations may be pre-programmed solutions that a user selects to automatically execute whenever one or more metrics (i.e., a condition set) match a pre-programmed threshold. Based upon the disclosure provided herein, one of ordinary skill in the art will recognize a variety of automated remediations, both diagnostic and active, that may be employed in relation to different embodiments. Further, based upon the disclosure provided herein, one of ordinary skill in the art will recognize a variety of condition sets that may be used to trigger automated remediations in relation to different embodiments.

The phrase "processing resource" is used in its broadest sense to mean one or more processors capable of executing instructions.

Example embodiments will now be described more fully hereinafter with reference to the accompanying drawings, in which exemplary embodiments are shown. This disclosure may, however, be embodied in many different forms and should not be construed as limited to the embodiments set forth herein.

Thus, for example, it will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for remedying network incidents. The methods include: providing, by a processor, telemetry from a plurality of network elements to an incident solution processing service, where the processor is deployed in a secure network with at least one of the plurality of network elements; and receiving, by the processor, a remediation command from the incident solution processing service, where the remediation command includes: an indication of at least one remediation maintained in a local remediation database communicably coupled to the processor; and identification information capable of identifying at least one of the plurality of network elements to which the remediation is to be applied. The methods further include: determining, by the processor, the at least one of the plurality of network elements to which the remediation is to be applied; and causing, by the processor, the at least one remediation to be executed by the at least one of the plurality of network elements to which the remediation is to be applied.

In some instances of the aforementioned embodiments the at least one of the plurality of network elements includes one or more of a network security appliance, a network switch, a network access point, a network database server, and/or a mobile device. In various instances of the aforementioned embodiments where the processor is separate from a network security appliance governing access to the secure network, and where causing the at least one remediation to be executed by the at least one of the plurality of network elements to which the remediation is to be applied includes causing the network security appliance to execute the at least one remediation. In some such instances, executing the at least one remediation by the network security appliance causes the network security appliance to make a modification to an operation of another of the plurality of network elements.

In various instances of the aforementioned embodiments, causing the at least one remediation to be executed by the at least one of the plurality of network elements to which the remediation is to be applied includes: authenticating, by the processor, to the at least one of the plurality of network elements; and issuing, by the processor, a command line command to execute the remediation on the at least one of the plurality of network elements. In some instances of the aforementioned embodiments, causing the at least one remediation to be executed by the at least one of the plurality of network elements to which the remediation is to be applied includes causing the network security appliance to execute the at least one remediation.

In some instances of the aforementioned embodiments, the methods further include accessing, by the processor, the remediation from the local remediation database. In some such instances, the remediation is a local remediation, and the methods further include: receiving, by the processor, the local remediation and at least one rule governing application of the local remediation; storing, by the processor, the local remediation to the local remediation database; and communicating, by the processor, an identification of the local remediation and the at least one rule governing application of the local remediation to the incident solution processing service.

In various instances of the aforementioned embodiments, the incident solution processing service is operated on a server outside of the secure network. In some instances of the aforementioned embodiments, the telemetry from the plurality of network elements includes telemetry from at least one network service outside of the secure network and one network device within the secure network.

Other embodiments provide network incident systems that include: a processing resource, a local remediation database, and a non-transitory computer readable medium. The local remediation database includes at least one remediation, and all of the processing resource, the local remediation database, and the non-transitory computer readable medium are deployed in a secure network. The non-transitory computer readable medium includes instructions executable by the processing resource to: provide telemetry from a plurality of network elements to an incident solution processing service, where at least one of the plurality of network elements is deployed in the secure network, and where the incident solution processing service is outside of the secure network; receive a remediation command from the incident solution processing service; determine the at least one of the plurality of network elements to which the remediation is to be applied; and cause the at least one remediation to be executed by the at least one of the plurality of network elements to which the remediation is to be applied. The remediation command includes: an indication of at least one remediation maintained in a local remediation database communicably coupled to the processor; and identification information capable of identifying at least one of the plurality of network elements to which the remediation is to be applied.

Yet other embodiments provide non-transitory computer-readable storage media embodying a set of instructions, which when executed by a processing resource deployed within a secure network, cause the processing resource to perform a method including: providing telemetry from a plurality of network elements to an incident solution processing service, where at least one of the plurality of network elements is deployed separate from the processing resource in the secure network, and where the incident solution processing service is outside of the secure network; receive a remediation command from the incident solution processing service; determining the at least one of the plurality of network elements to which the remediation is to be applied; and causing the at least one remediation to be executed by the at least one of the plurality of network elements to which the remediation is to be applied. The remediation command includes: an indication of at least one remediation maintained in a local remediation database communicably coupled to the processor; and identification information capable of identifying at least one of the plurality of network elements to which the remediation is to be applied.

Turning to FIG. 1A, network architecture 100 is shown in accordance with some embodiments. In the context of network architecture 100, a network incident solutions software as a service (SaaS) 130 is communicably coupled to a public network 102. Those skilled in the art will appreciate that public network 102 can be, but is not limited to, a wireless network, a wired network or a combination thereof that can be implemented as one of the various types of networks, such as an Intranet, a Local Area Network (LAN), a Wide Area Network (WAN), an Internet, and the like. Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

A cloud service 108 may be communicably coupled to public network 102. Cloud service 108 may be any service known in the art that may be hosted on a third-party server and accessed via a communication network. Based upon the disclosure provided herein, one of ordinary skill in the art will recognize a variety of cloud services that may be employed in relation to different embodiments. In a typical situation, a cloud service is accessible via a defined application programming interface (API) to authorized entities. That said, while the authorized entities may be able to use the service, they are generally not allowed to perform administrative operations on the cloud service. Rather, such administrative operations are typically reserved for the third party's personnel.

A network security appliance 110 governs access to network devices communicably coupled to a private network 112. Those skilled in the art will appreciate that private network 112 can be, but is not limited to, a wireless network, a wired network or a combination thereof that can be implemented as one of the various types of networks, such as an Intranet, a Local Area Network (LAN), a Wide Area Network (WAN), an Internet, and the like. Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Such network devices may include, but are not limited to, one or more network access points 119, network device 118 (shown as a network device 118-1 to a network device 118-N), and an agentless remediation controller 114. Based upon the disclosure provided herein, one of ordinary skill in the art will recognize a variety of network devices that may be communicably coupled to private network 112 in accordance with different embodiments.

Agentless remediation controller 114 may be deployed on any server or computer that is communicably coupled to private network 112. Agentless controller 114 is configured to monitor a defined set of attributes corresponding to the operation of private network 112 in general, one or more network devices communicably coupled to private network 112, and/or one or more cloud services accessible via public network 102. As used herein, this set of attributes is referred to as telemetry data. Agentless controller 114 is further configured to transmit this telemetry data to network incident solutions SaaS 130 which determines whether one or more network incidents have occurred based upon the telemetry data.

Where network incident solutions SaaS 130 determines that a network incident has occurred, it identifies one or more automated remediations to be applied in response to the identified network incident. In addition, network incident solutions SaaS 130 generates identification information corresponding to one or more network devices associated with the identified network incident(s), and communicates both the identification information and the identity of one or more automated remediations to be applied to agentless remediation controller 114.

In some embodiments, identifying the one or more network devices associated with the identified network incident (s) by the network incident solutions SaaS 130 is not possible as the telemetry data was not received from such a device and network incident solutions SaaS 130 may not have sufficient information to correctly identify a network element or network elements that are the cause of network incident(s). In such embodiments, network incident solutions SaaS 130 provides identification information based upon the received telemetry data that is related to the identified network incident(s). This identification information is provided to agentless remediation controller 114 that provided the telemetry data, and is used by agentless remediation controller 114 to correctly identify the exact network devices to which the one or more automated remediations identified by network incident solutions SaaS 130 is/are to be applied. Such identification information may include, but is not limited to, vendor information about a device including, but not limited to, vendor name, device type, device model number, connected ports of the device, and/or the like. Based upon the disclosure provided herein, one of ordinary skill in the art will recognize a variety of identification information that may be garnered from telemetry data by network incident solutions SaaS 130, and provided to agentless remediation controller 114.

As an example, the telemetry data may indicate that there is a signal to noise ratio in network access point 119 that is below an allowable threshold. In response, network incident solutions SaaS 130 identifies a remediation of cycling power to network access point 119. In such a case, network incident solutions SaaS 130 would identify the remediation calling for cycling power to network access point 119 and provide identification information about network access point 119. This identification may include, but is not limited to, a communication port associated with network access point 119 and a manufacturer of network access point 119. Agentless remediation controller 114 has access to network information that may, for example, indicate that cycling power to network access point 119 is controlled by network security appliance 110. Thus, using identification information received from network incident solutions SaaS 130 and its knowledge of where a remediation is to be applied, agentless remediation controller 114 identifies network security appliance 110 as the target of the remediation. In such a case, agentless remediation controller 114 communicates the remediation to network security appliance 110 and commands execution of the remediation. Such execution results in cycling power to network access point 119. Based upon the disclosure provided herein, one of ordinary skill in the art will recognize a variety of identification information and remediation application information that may be provided to and/or used by agentless remediation controller 114 to discern on which network device a given remediation is to be applied.

In some embodiments, agentless remediation controller 114 identifies a single network device based upon the identification information received from network incident solutions SaaS 130. In such an embodiment, the remediation identified by network incident solutions SaaS 130 is accessed from a local automated remediations database 116 by agentless remediation controller 114, and agentless remediation controller 114 communicates the remediation along with a command to execute the remediation to the single network device. In other embodiments, agentless remediation controller 114 identifies two or more network devices based upon the identification information received from network incident solutions SaaS 130. In such an embodiment, the remediation identified by network incident solutions SaaS 130 is accessed from a local automated remediations database 116 by agentless remediation controller 114, and agentless remediation controller 114 either: (a) communicates the remediation along with a command to execute the remediation to each of the two or more network devices where all of the steps of the identified remediation are to be equally applied on the devices, or (b) divides the identified remediation into subsets and communicates a first subset of the remediation along with a command to execute the first subset of the remediation to one of the two or more network devices and communicates a second subset of the remediation along with a command to execute the second subset of the remediation to another of the two or more network devices.

In some embodiments, agentless remediation controller 114 communicates the automated remediation and the command to execute the automated remediation by logging into the identified network device remotely and performing a command line access to the identified network device. In the command line the agentless remediation controller 114 executes a script that causes the automated remediation to execute on the identified network device. Causing the automated remediation to execute may be done over a series of remote connections to the identified network device or devices followed by command line commands.

Network incident solutions SaaS 130 may include one or more processors and/or circuitry implementing processing functions configured to: receive telemetry data from a number of different agentless remediation controllers (e.g., an agentless remediation controller 114) that are each deployed within a given network (e.g., a private network 112), identify one or more network incidents from the received telemetry data, generate identification information corresponding to one or more network devices associated with the identified network incident(s), and communicate; identify one or more remediations to be applied in relation to the network incident (s), and communicate the identity of the remediation(s) and the identification information to the agentless remediation controller.

Network incident solutions SaaS 130 includes a network incident identification and remediations processor 131 that executes instructions from a network incident solutions and remediations instructions memory 132. Executing the instructions from network incident solutions and remediations instructions memory 132 causes network incident identification and remediations processor 131 to: receive telemetry data from one or more agentless remediation controllers, determine one or more network incidents based upon the received telemetry data, identify one or more network devices associated with the identified network incident(s), and communicate one or more automated remediations related to the network incident(s) to a respective agentless remediation controller.

Network incident identification and remediation processor 131 is communicably coupled to an automated remediations database 133 and an incident database 134. Incident database 134 includes incident data that is a catalog of information about network element malfunctions including solutions for the cataloged network element malfunctions. In some embodiments, incident database 134 is organized similar to that discussed in relation to FIG. 1B of U.S. patent application Ser. No. 17/238,316 entitled "Systems and Methods for Incorporating Automated Remediation Into Information Technology Incident Solutions", and filed Apr. 23, 2021 by Abate et al. The entirety of the aforementioned reference is incorporated herein by reference for all purposes. Automated remediations database 133 includes identifications (i.e., unique names) of a number of pre-programmed automated remediations and rules for triggering each of the respective automated remediations.

In some embodiments, network incident solutions SaaS 130 is implemented to include similar functionality to that discussed in relation to elements 127, 129, 135, 150, 152, and 155 of FIG. 1A of U.S. patent application Ser. No. 17/238,316 entitled "Systems and Methods for Incorporating Automated Remediation Into Information Technology Incident Solutions", and filed Apr. 23, 2021 by Abate et al. The entirety of the aforementioned reference was previously incorporated herein by reference for all purposes. In such embodiments, network incident solutions SaaS 130 may process telemetry data and based thereon identify one or more remediations that can be applied to address the network incidents similar to that discussed in the aforementioned reference. The identified remediations are, however, identified to an agentless remediation controller that provided the original telemetry data. It is this agentless remediation controller that identifies the appropriate network devices that will apply the automated remediation, and commands the identified network devices to execute the identified automated remediation.

Figure 1B:
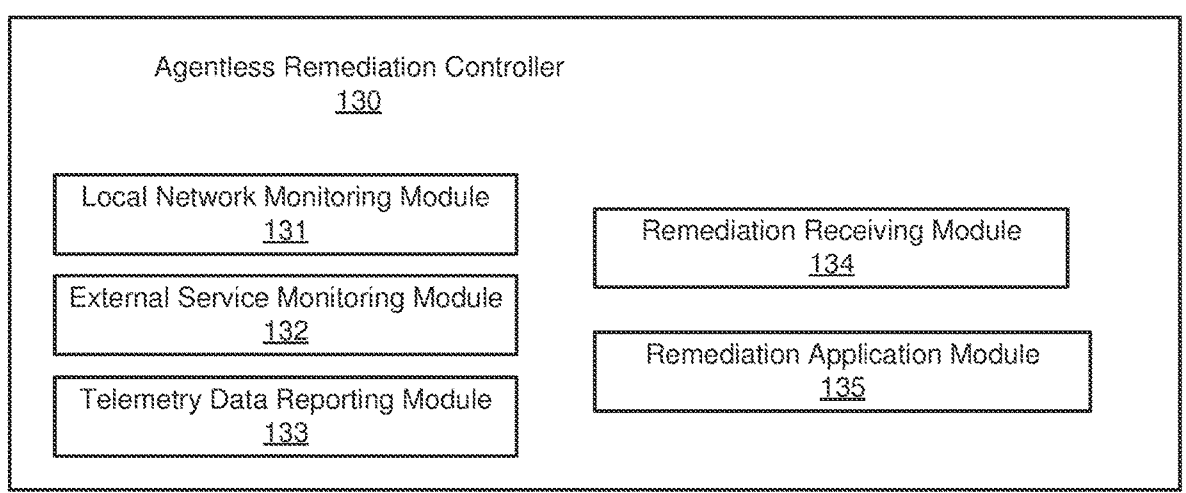

Turning to FIG. 1B, an example implementation of an agentless remediation controller 150 is shown in accordance with some embodiments. Agentless remediation controller 150 may be used in place of agentless remediation controller 114. As shown, agentless remediation controller 130 includes: a local network monitoring module 131, an external service monitoring module 132, a telemetry data reporting module 133, a remediation receiving module 134, and a remediation application module 135.

Local network monitoring module 131 is configured to collect telemetry data from a local network and network elements within the local network. Such telemetry may include, but is not limited to, signal to noise ratios associated with various areas of the network, power status of elements in the network, bandwidth of elements of the network, or the like. Gathering this telemetry in some cases includes authenticating to the element of the network to gain access, and then once access is gained the various telemetry for that particular element is gathered. Based upon the disclosure provided herein, one of ordinary skill in the art will recognize a variety of telemetry and/or approaches for gathering such telemetry in relation to a local network and network elements within the local network that may be used in relation to different embodiments.

External service monitoring module 132 is configured to gather telemetry data regarding the operation of one or more services accessible outside of a local network (e.g., a cloud based service). This involves accessing one or more devices, elements or services outside of the local network. As such devices, elements, or services are generally not controlled by the same entity that controls the local network, it may not be possible to gain administrative access. In such cases, the telemetry data is gathered using information that is accessible by accessing the target outside of the local network via a public API. Such telemetry may include, but is not limited to, whether the element or service is accessible, the speed at which the element or service responds, bandwidth supported by the element or service, or the like. Based upon the disclosure provided herein, one of ordinary skill in the art will recognize a variety of telemetry that may be gathered about elements and services outside of the network that may be used in relation to different embodiments.

Telemetry data reporting module 133 is configured to assemble telemetry data that is gathered into a reporting package that includes a variety of metadata providing context for the telemetry data. The metadata may include, but is not limited to, information about the device or service from which the telemetry was obtained, time of day, or the like.

Remediation receiving module 134 is configured to receive a remediation command from a incident solution processing service. The remediation command includes: an indication of at least one remediation maintained in a local remediation database communicably coupled to the processor; and identification information capable of identifying at least one of the plurality of network elements to which the remediation is to be applied.

Figure 1C:
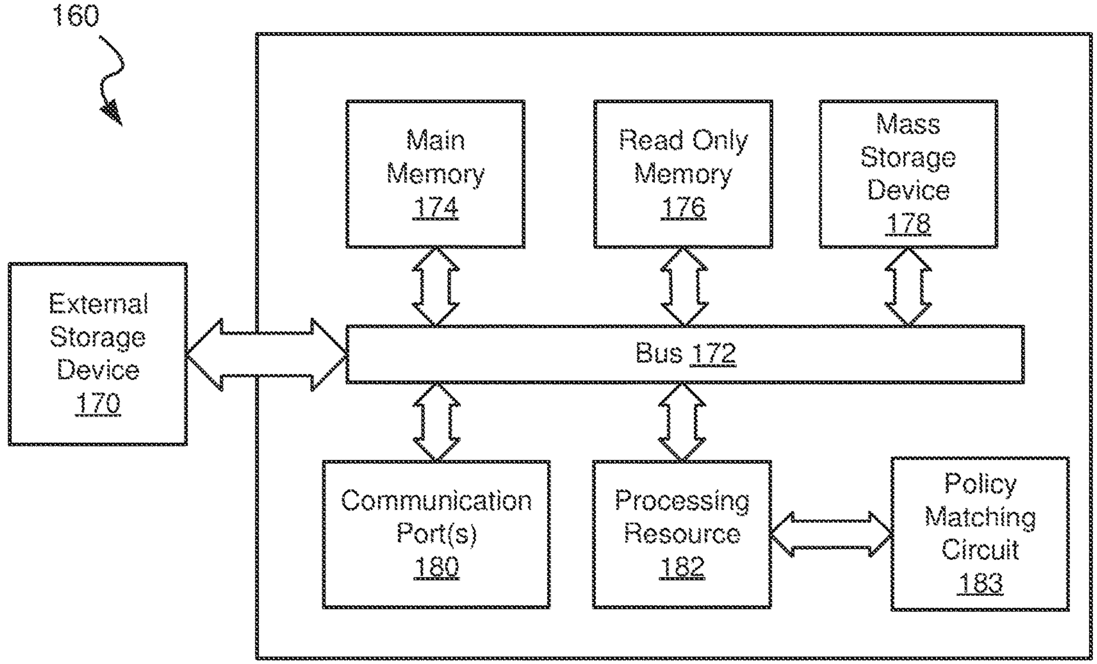

Remediation application module 135 is configured to: access an identified remediation from a local remediation database, determine which of a number of network elements to which a received remediation is to be applied, and cause the determined remediation to be executed by the network element to which the remediation is to be applied Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources or processors (e.g., processing circuitry 182). In one embodiment, computer system 160 may represent some portion of network incident identification and remediation processor 131, and/or agentless remediation controller 114.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure. Processor 182 may communicate with a policy matching circuit 183. Policy matching circuit 183 includes a number of comparators that can be configured to apply a received network packet to a non-equal boundary policy set search tree to identify one or more policies from a network policy set that are to be applied to the network packet.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc—Read Only Memory (CD-ROM), Compact Disc—Rewritable (CD-RW), Digital Video Disk—Read Only Memory (DVD-ROM). Components described above are meant only to show various possibilities. In no way should the aforementioned example computer systems limit the scope of the present disclosure.

Figure 2:
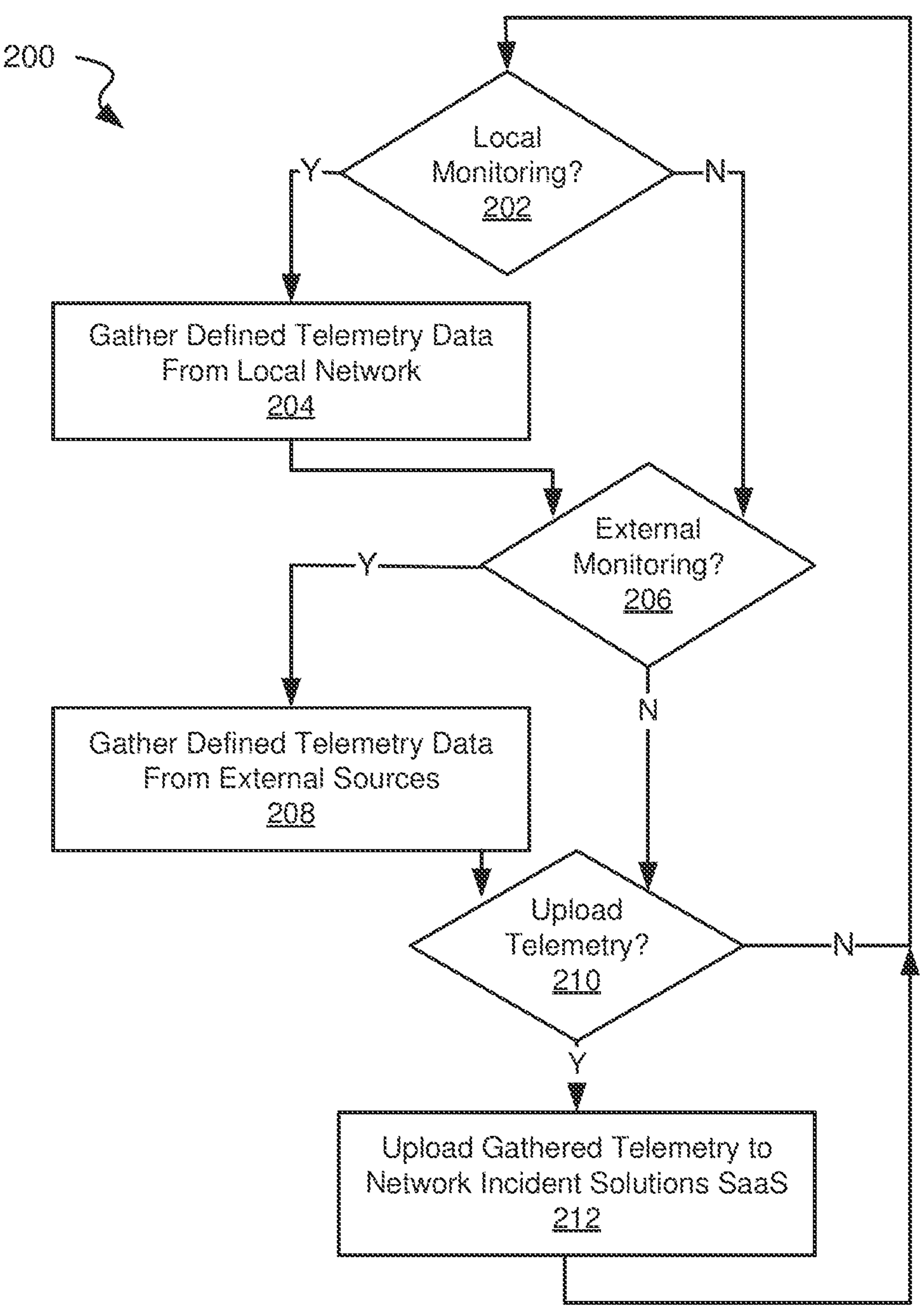
FIG. 2 is a flow diagram showing a method in accordance with various embodiments for requesting automated remediations oversight by an external incident solutions processing system.

Turning to FIG. 2, a flow diagram 200 shows a method in accordance with various embodiments for requesting automated remediations oversight by an external incident solutions processing system. Following flow diagram 200, it is determined whether monitoring of network elements in a local network is to be performed (block 202). As an example, this may include agent remediation controller 114 monitoring network elements within private network 112 including: network security appliance 110, network access point 119, network device 118-1, and network device 118-2. Where monitoring of network elements in a local network is to be performed (block 202), a defined set of telemetry associated with the local network and/or elements within the local network is gathered (block 204). Such telemetry may include, but is not limited to, signal to noise ratios associated with various areas of the network, power status of elements in the network, bandwidth of elements of the network, or the like. Gathering this telemetry in some cases includes authenticating to the element of the network to gain access, and then once access is gained the various telemetry for that particular element is gathered. Based upon the disclosure provided herein, one of ordinary skill in the art will recognize a variety of telemetry that may be gathered about a network and elements of the network that may be used in relation to different embodiments.

It is determined whether monitoring of elements or services outside of the local network is to be performed (block 206). As an example, this may include agent remediation controller 114 accessing cloud service 108 via a public application programming interface (API). As cloud service 108 is generally not controlled by the same entity that controls private network 112, it may not be possible to gain administrative access to cloud service 108. Where monitoring of elements or services outside of the local network is to be performed (block 206), a defined set of telemetry associated with the elements or services outside of the local network is gathered (block 208). Such telemetry may include anything that is accessible. As the external elements or services may not be administratively accessible, the gathered telemetry may be limited to that which can be gathered via a public API. Such telemetry may include, but is not limited to, whether the element or service is accessible, the speed at which the element or service responds, bandwidth supported by the element or service, or the like. Based upon the disclosure provided herein, one of ordinary skill in the art will recognize a variety of telemetry that may be gathered about elements and services outside of the network that may be used in relation to different embodiments.

The aforementioned monitoring processes are performed periodically with the gathered information being stored to a local database. It is determined whether it is time to upload the gathered telemetry to a network incident SaaS (block 210). In some embodiments, the telemetry is gathered at a frequency that is greater than the frequency at which the gathered data is to be uploaded. In such a case, several updates of the telemetry may occur for each time the telemetry is uploaded. In some embodiments, the frequency for uploading the telemetry is fixed. In other embodiments an otherwise fixed frequency for uploading the telemetry is modified whenever a network event is identified by an agentless remediation controller. Such an event may include, for example, an alert from a human administrator of the private network in which the agentless remediation controller, or a power loss event in the private network. Based upon the disclosure provided herein, one of ordinary skill in the art will recognize a variety of events that may cause a change in the otherwise fixed reporting frequency. Where it is time to upload the gathered telemetry (block 210), the gathered telemetry is uploaded to a network incident solutions SaaS (block 212).

The network incident solutions SaaS analyzes any telemetry that is received to identify any potential network incident(s) and to determine a remediation to be applied in mitigating the identified potential network incident(s). Any remediation(s) determined by the network incident solutions SaaS are identified to the agentless remediation controller that provided the telemetry. In some cases, the telemetry data is insufficient to identify which elements of the network to which the determined remediation(s) are to be applied. In such cases, the network incident solutions SaaS provides identification information based upon the received telemetry data that is related to the identified network incident(s). This identification information is provided to the agentless remediation controller that provided the telemetry data, and is used by the agentless remediation controller to correctly identify the exact elements in the network to which the one or more automated remediations determined by the network incident solutions SaaS is/are to be applied. Such identification information may include, but is not limited to, vendor information about a device including, but not limited to, vendor name, device type, device model number, connected ports of the device, and/or the like. Based upon the disclosure provided herein, one of ordinary skill in the art will recognize a variety of identification information that may be garnered from telemetry data by the network incident solutions SaaS, and provided to the agentless remediation controller.

In some embodiments, the network incident solutions SaaS is implemented to include similar functionality to that discussed in relation to elements 127, 129, 135, 150, 152, and 155 of FIG. 1A of U.S. patent application Ser. No. 17/238,316 entitled "Systems and Methods for Incorporating Automated Remediation Into Information Technology Incident Solutions", and filed Apr. 23, 2021 by Abate et al. The entirety of the aforementioned reference was previously incorporated herein by reference for all purposes. In such embodiments, the network incident solutions SaaS may process telemetry data and based thereon identify one or more remediations that can be applied to address the network incidents similar to that discussed in the aforementioned reference.

Figure 3:
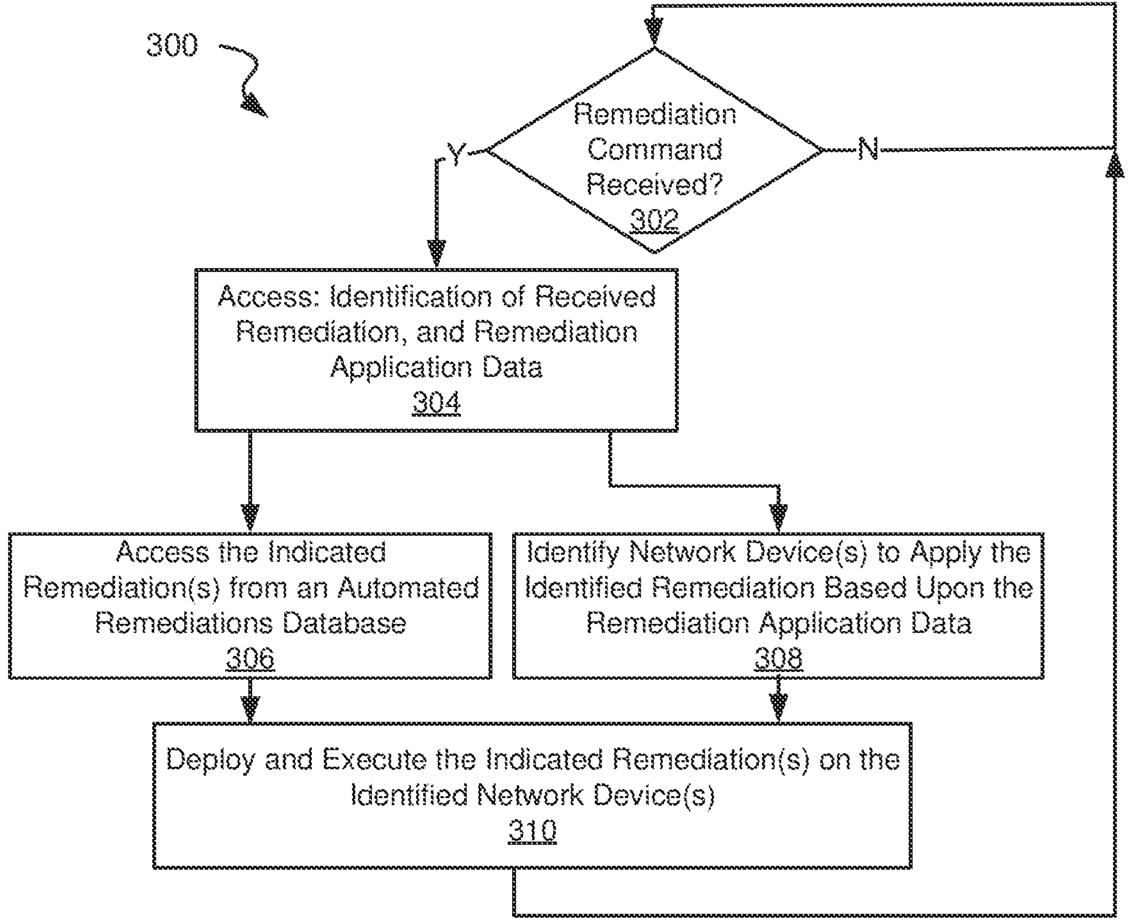
FIG. 3 is a flow diagram showing a method in accordance with some embodiments for applying an automated remediation identified by an external incident solutions processing system.

Turning to FIG. 3, it is determined if a remediation command has been received from the network incident solutions SaaS (block 302). The executable for all remediations are maintained local to the agentless remediation controller. As such, the received remediation command includes an indication of one or more remediations that are locally maintained. In addition, the received remediation command will include identification information from the network incident solutions SaaS that can be used by the agentless remediation controller to identify which elements of the network to apply the remdiation(s).

Both the indication of one or more remediations and the identification information from the network incident solutions SaaS that can be used by the agentless remediation controller to identify which elements of the network to apply the remediation(s) is accessed from the received remediation (block 304). The indication of one or more remediations is used to access an automated remediations database to access the remediation(s) that are to be applied (block 306). In addition, the identification information is used to determine which element or elements in the network that the remediation(s) are to be applied (block 308). The identification information may include, but is not limited to, vendor information about a device including, but not limited to, vendor name, device type, device model number, connected ports of the device, and/or the like. Agentless remediations controller uses this type of identification information received from the network incident solutions SaaS along with its knowledge of the devices and topology of the local network to determine where the indicated remediation(s) are to be executed.

The indicated remediation(s) are then deployed and executed on the determined elements within the network (block 310). This may include, but is not limited to, deploying and executing a single remediation on a single network element, deploying and executing a remediation on one network element and another remediation on another network element, deploying the same remediation on multiple network elements. Based upon the disclosure provided herein, one of ordinary skill in the art will recognize a variety of combinations of remediations and network elements that may be involved in resolving a network incident in accordance with different embodiments.

The process of deploying and executing a remediation on a network element may include the agentless remediation controller communicating the indicated remediation and a command to execute the indicated remediation by logging into the identified network element remotely and performing a command line access to the identified network element. In the command line the agentless remediation controller executes a script that causes the automated remediation to execute on the identified network device. Causing the indicated remediation to execute may be done over a series of remote connections to the identified network element followed by command line commands.

Figure 4:
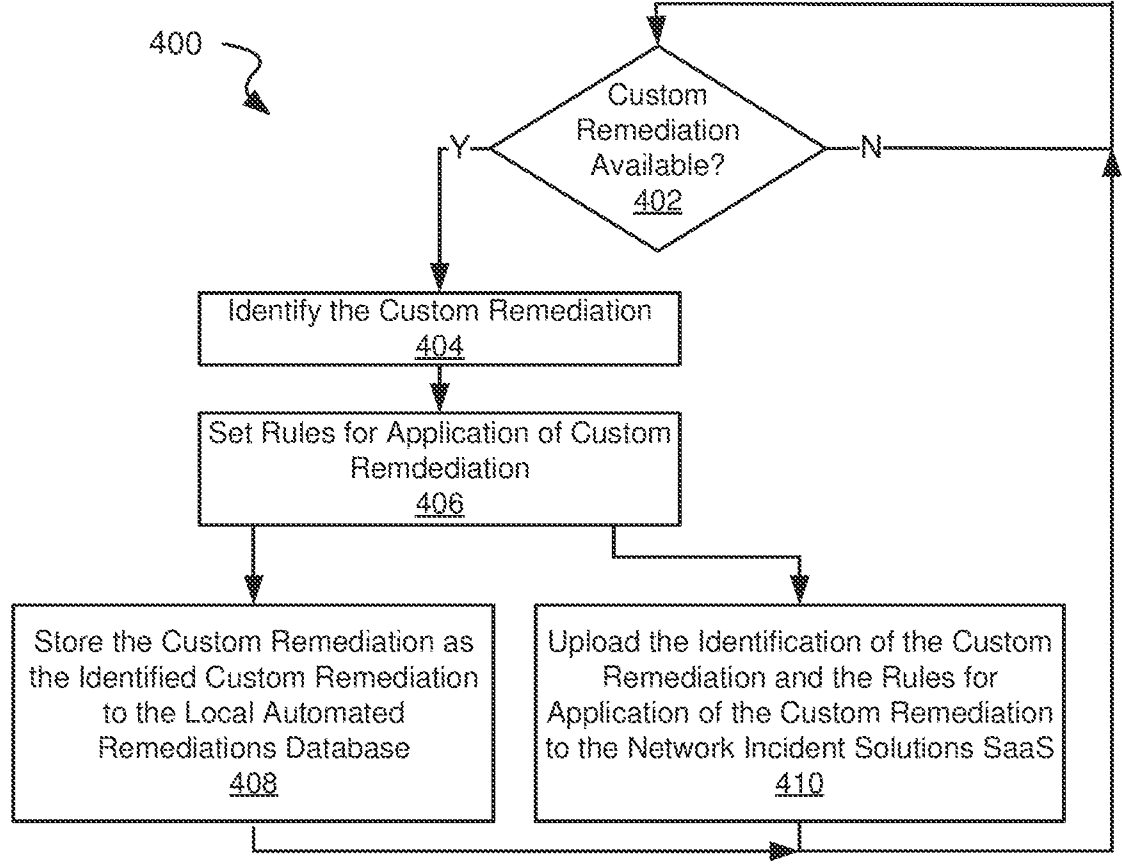
FIG. 4 is a flow diagram showing a method in accordance with various embodiments for augmenting an automated remediations database and application system.

Turning to FIG. 4, it is determined whether a custom remediation is to be added to the local automated remediations database (block 402). In some cases, a user may define a remediation that is to be used only in relation to the user's network. Where such is the case, the user creates a custom remediation which is a series of one or more processes designed to mitigate or cure a particular network incident.

Where a custom remediation is available to be added to the automated remediations database (block 402), a user is prompted to identify the custom remediation (block 404). This may involve, for example, providing a unique name or identification to the custom remediation. In addition, the user is prompted to provide rules for governing application of the custom remediation (block 406). Such rules are used to discern scenarios in which the custom remediation is to be applied. As an example, where the remediation is to cycle power to a network access point, the rules governing application of the remediation may be when a signal to power ration below a defined threshold has occurred. Based upon the disclosure provided herein, one of ordinary skill in the art will recognize a variety of custom remediations and corresponding rules governing such custom remediations that may be defined and used in accordance with different embodiments.

The custom remediation is stored relative to the unique name or identification in the local automated remediations database (block 408). This custom remediation may be later identified by the network incident solutions SaaS, and deployed and executed by the agentless remediation controller. In addition, the identification of the custom remediation and the rules governing application of the custom remediation are uploaded to the network incident solutions SaaS (block 410). The rules for applying the custom remediation are stored relative to the identification of the custom remediation in a database associated with the network incident solutions SaaS (e.g., network incident solutions and remediations instructions memory 132). As such, the custom remediation is considered as a possible remediation by the network incident solutions SaaS when the next telemetry data is provided by the agentless remediation controller.

Where the custom remediation is determined to be applicable based upon received telemetry, the network incident solutions SaaS indicates the custom remediation by its unique identifier along with identification information to the agentless remediation controller. In turn, the agentless remediation controller accesses the custom remediation from the local automated remediations database, and deploys and executes the custom remediation similar to that discussed above in relation to FIG. 3.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for remedying network incidents, the method comprising:

providing, by a processor, telemetry from a plurality of network elements to an incident solution processing service, wherein the processor is deployed in a secure network with at least one of the plurality of network elements;

receiving, by the processor, a remediation command from the incident solution processing service, wherein the remediation command includes:

an indication of at least one remediation maintained in a local remediation database communicably coupled to the processor; and identification information capable of identifying at least one of the plurality of network elements to which the remediation is to be applied;

determining, by the processor, the at least one of the plurality of network elements to which the remediation is to be applied;

accessing, by the processor, the at least one remediation from the local remediation database; and causing, by the processor, the at least one remediation to be executed by the at least one of the plurality of network elements to which the remediation is to be applied, including: authenticating, by the processor, to the at least one of the plurality of network elements; and issuing, by the processor, a command line command to execute the remediation on the at least one of the plurality of network elements.

2. The method of claim 1, wherein the at least one of the plurality of network elements is selected from a group consisting of: a network security appliance, a network switch, a network access point, a network database server, and a mobile device.

3. The method of claim 1, wherein the processor is separate from a network security appliance governing access to the secure network, and wherein causing the at least one remediation to be executed by the at least one of the plurality of network elements to which the remediation is to be applied includes causing the network security appliance to execute the at least one remediation.

4. The method of claim 3, wherein executing the at least one remediation by the network security appliance causes the network security appliance to make a modification to an operation of another of the plurality of network elements.

5. The method of claim 1, wherein causing the at least one remediation to be executed by the at least one of the plurality of network elements to which the remediation is to be applied includes causing a network security appliance to execute the at least one remediation.

6. The method of claim 1, the method further comprising:

accessing, by the processor, the remediation from the local remediation database.

7. The method of claim 6, wherein the remediation is a local remediation, and wherein the method further comprises:

receiving, by the processor, the local remediation and at least one rule governing application of the local remediation;

storing, by the processor, the local remediation to the local remediation database; and communicating, by the processor, an identification of the local remediation and the at least one rule governing application of the local remediation to the incident solution processing service.

8. The method of claim 1, wherein the incident solution processing service is operated on a server outside of the secure network.

9. The method of claim 1, wherein the telemetry from the plurality of network elements includes telemetry from at least one network service outside of the secure network and one network device within the secure network.

10. A network incident system, the network incident system comprising:

a processing resource;

a local remediation database, wherein the local remediation database includes at least one remediation;

a non-transitory computer readable medium, wherein all of the processing resource, the local remediation database, and the non-transitory computer readable medium are deployed in a secure network, and wherein the non-transitory computer readable medium includes instructions executable by the processing resource to:

provide telemetry from a plurality of network elements to an incident solution processing service, wherein at least one of the plurality of network elements is deployed in the secure network, and wherein the incident solution processing service is outside of the secure network;

receive a remediation command from the incident solution processing service, wherein the remediation command includes:

an indication of at least one remediation maintained in a local remediation database communicably coupled to the processor; and identification information capable of identifying at least one of the plurality of network elements to which the remediation is to be applied;

determine the at least one of the plurality of network elements to which the remediation is to be applied;

accessing, by the processor, the at least one remediation from the local remediation database; and cause the at least one remediation to be executed by the at least one of the plurality of network elements to which the remediation is to be applied, including: authenticating, by the processor, to the at least one of the plurality of network elements; and issuing, by the processor, a command line command to execute the remediation on the at least one of the plurality of network elements.

11. The system of claim 10, wherein the at least one of the plurality of network elements is selected from a group consisting of: a network security appliance, a network switch, a network access point, a network database server, and a mobile device.

12. The system of claim 10, wherein the processing resource is separate from a network security appliance governing access to the secure network, and wherein causing the at least one remediation to be executed by the at least one of the plurality of network elements to which the remediation is to be applied includes causing the network security appliance to execute the at least one remediation.

13. The system of claim 12, wherein executing the at least one remediation by the network security appliance causes the network security appliance to make a modification to an operation of another of the plurality of network elements.

14. The system of claim 10, wherein causing the at least one remediation to be executed by the at least one of the plurality of network elements to which the remediation is to be applied includes causing a network security appliance to execute the at least one remediation.

15. The system of claim 10, wherein the non-transitory computer readable medium further includes instructions executable by the processing resource to:

access the remediation from the local remediation database.

16. The system of claim 15, wherein the remediation is a local remediation, and wherein the non-transitory computer readable medium further includes instructions executable by the processing resource to:

receive the local remediation and at least one rule governing application of the local remediation;

store the local remediation to the local remediation database; and communicate an identification of the local remediation and the at least one rule governing application of the local remediation to the incident solution processing service.

17. The system of claim 10, wherein the telemetry from the plurality of network elements includes telemetry from at least one network service outside of the secure network and one network device within the secure network.

18. A non-transitory computer-readable storage medium embodying a set of instructions, which when executed by a processing resource deployed within a secure network, cause the processing resource to perform a method comprising:

providing telemetry from a plurality of network elements to an incident solution processing service, wherein at least one of the plurality of network elements is deployed separate from the processing resource in the secure network, and wherein the incident solution processing service is outside of the secure network;

receiving a remediation command from the incident solution processing service, wherein the remediation command includes:

an indication of at least one remediation maintained in a local remediation database communicably coupled to the processor;

access the at least one remediation from the local remediation database; and identification information capable of identifying at least one of the plurality of network elements to which the remediation is to be applied;

determining the at least one of the plurality of network elements to which the remediation is to be applied; and causing the at least one remediation to be executed by the at least one of the plurality of network elements to which the remediation is to be applied, including: authenticating, by the processor, to the at least one of the plurality of network elements; and issuing, by the processor, a command line command to execute the remediation on the at least one of the plurality of network elements.

* * * * *